(12) United States Patent
Goettl et al.

(10) Patent No.: US 7,992,233 B1
(45) Date of Patent: Aug. 9, 2011

(54) HYDRAULIC SUCTION FUSE

(75) Inventors: John M. Goettl, Phoenix, AZ (US); R. Dominic Conn, Tempe, AZ (US); Steven R. Barnes, Maricopa, AZ (US)

(73) Assignee: GSG Holdings, Inc., Chandler, AZ (US)

( * ) Notice: Subject to any disclaimer, the term of this patent is extended or adjusted under 35 U.S.C. 154(b) by 771 days.

(21) Appl. No.: 12/106,946

(22) Filed: Apr. 21, 2008

(51) Int. Cl.
    *E04H 4/00* (2006.01)
(52) U.S. Cl. .................... 4/504; 4/507; 4/508; 4/509
(58) Field of Classification Search ...... 4/504, 507–512; 210/167.1, 167.12
    See application file for complete search history.

(56) References Cited

U.S. PATENT DOCUMENTS

| | | | |
|---|---|---|---|
| 3,026,903 A * | 3/1962 | Roach ..................... 137/533.13 |
| 4,776,908 A | 10/1988 | Sapp | |
| 5,265,631 A | 11/1993 | Goettl | |
| 5,365,617 A | 11/1994 | Tarr | |
| 5,682,624 A * | 11/1997 | Ciochetti ........................ 4/509 |
| 5,822,807 A | 10/1998 | Gallagher et al. | |
| 5,878,773 A | 3/1999 | Robol | |
| 5,947,700 A | 9/1999 | McKain et al. | |
| 5,991,939 A | 11/1999 | Mulvey | |
| 6,098,654 A | 8/2000 | Cohen et al. | |
| 6,341,387 B1 * | 1/2002 | Zars ................................. 4/504 |
| 6,895,608 B2 | 5/2005 | Goettl | |
| 6,935,364 B1 * | 8/2005 | Tarazona et al. ............ 137/529 |
| 7,055,189 B2 | 6/2006 | Goettl | |
| 7,089,606 B2 * | 8/2006 | Goettl .............................. 4/507 |
| 7,213,275 B2 | 5/2007 | Goettl | |
| 7,934,273 B1 * | 5/2011 | Goettl et al. ..................... 4/504 |
| 2008/0029164 A1 * | 2/2008 | Ciochetti ..................... 137/526 |

\* cited by examiner

*Primary Examiner* — Brian Glessner
*Assistant Examiner* — Gisele Ford
(74) *Attorney, Agent, or Firm* — Booth Udall, PLC (57) ABSTRACT

A swimming pool hydraulic suction fuse system. Implementations may include a fuse housing having a pump outlet, a drain inlet, and an air source. The hydraulic suction fuse system may also include a fuse assembly coupled into the fuse housing, the fuse assembly having a fuse body including a first section and a second section. An air intake may be coupled to the fuse body and a magnet assembly may be coupled to the first section of the fuse body. The magnet assembly may include a solid magnet. A fuse may be included, which may be coupled to the second section of the fuse body and include an attractor element coupled between a fuse cap and a fuse stem.

24 Claims, 7 Drawing Sheets

HYDRAULIC SUCTION FUSE

BACKGROUND

1. Technical Field

Aspects of this document relate to suction relief devices for use in swimming pools and spas.

2. Background Art

Swimming pool cleaning systems rely on a drain typically located in the floor of a pool to gather contaminants into a filtration system. The drain is connected to a pump, which generates suction pressure to cause water to flow through the drain. In many pool systems, the suction developed by the pump is significant and also concentrated in the relatively small area of the drain. Such a source of concentrated suction presents a hazard to swimmers, who may be inadvertently held under water through entrainment of hair, clothes or body parts into or against the drain. Conventionally, suction relief devices have been provided to break the suction pressure at a preset level to allow a swimmer to break free and prevent drowning. Such conventional devices are illustrated in U.S. Pat. Nos. 6,895,608, 7,055,189, 7,089,606 and 7,213,275 to Goettl, the disclosures of which are hereby incorporated by reference.

SUMMARY

Implementations of a swimming pool hydraulic suction fuse system may include a fuse housing having a pump outlet, a drain inlet, and an air source. The hydraulic suction fuse system may also include a fuse assembly coupled into the fuse housing, the fuse assembly having a fuse body including a first section and a second section. An air intake may be coupled to the fuse body and a magnet assembly may be coupled to the first section of the fuse body. The magnet assembly may include a solid magnet or other magnet. A fuse may be included, which may be coupled to the second section of the fuse body and include an attractor element coupled between a fuse cap and a fuse stem.

Implementations of a swimming pool hydraulic suction fuse system may include one, some, or all of the following:

The first section of the fuse body may have a first diameter and the second section of the fuse body may have a second diameter larger than the first diameter. The first section and second section of the fuse body may be joined through a coupling flange extending outwardly from an end of the first section of the fuse body.

The coupling flange may include at least one suction channel therethrough and one release channel therein.

The suction channel may extend through the coupling flange at an angle relative to a side of the second section of the fuse body.

The angle of the suction channel may be about 45 degrees.

The fuse cap may include a center flattened portion and an angled flange extending away from the center flattened portion at an angle relative to the center flattened portion.

The angle of the angled flange may be about 45 degrees.

The fuse stem may include a rod coupled substantially at the center of the center flattened portion and the rod may extend into an aperture in a second section cap coupled to the second section of the fuse body.

The rod may include at least one fin having at least one fin extension thereon configured to allow passage of the rod along a portion of a length of the rod when the rod is engaged through a slot in the second section cap of the fuse body.

The fuse body may include at least one step and the magnet assembly may be configured to couple with the at least one step.

The magnet assembly may have a pin and couple to the at least one step of the fuse body through the pin.

Implementations of a fuse body for a swimming pool hydraulic suction fuse may include a first section and a second section joined by a coupling flange, at least one suction channel in the coupling flange, at least one release channel in the coupling flange, and a top aperture in the first section.

Implementations of a fuse body may include one, some, or all of the following:

The at least one suction channel may be angled relative to a side of the second section of the fuse body.

The at least one suction channel may be between about 0 degrees to about 90 degrees.

The angle of the at least one suction channel may be about 45 degrees.

The coupling flange may include an inner surface and an outer surface and the release channel may be disposed adjacent to the at least one suction channel in the inner surface of the coupling flange.

The coupling flange may include an inner perimeter and at least one angled projection extending from the inner perimeter adjacent to the at least one suction channel.

The fuse body may include a first step and a second step where the first step has a first height and the second step has a second height and the second height is different from the first height.

The fuse body may include at least two sets of steps where each of the at least two sets of steps spirals upwardly or downwardly within the first section of the fuse body.

Implementations of an air intake for a swimming pool hydraulic suction fuse may include an air inlet having at least one aperture therethrough and at least one air tower coupled to and in fluid communication with the air inlet. The air inlet may be coupled to a fuse body and the at least one air tower may be in fluid communication with ambient air.

Implementations of an air intake may include one, all, or some of the following:

The air intake may include two air towers coupled to the air inlet. The two air towers may be substantially the same length.

The air inlet may include a plurality of apertures therethrough.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended hydraulic suction fuse and/or assembly procedures for a hydraulic suction fuse will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such hydraulic suction fuses and implementing components, consistent with the intended operation.

Structure.

Figure 1:
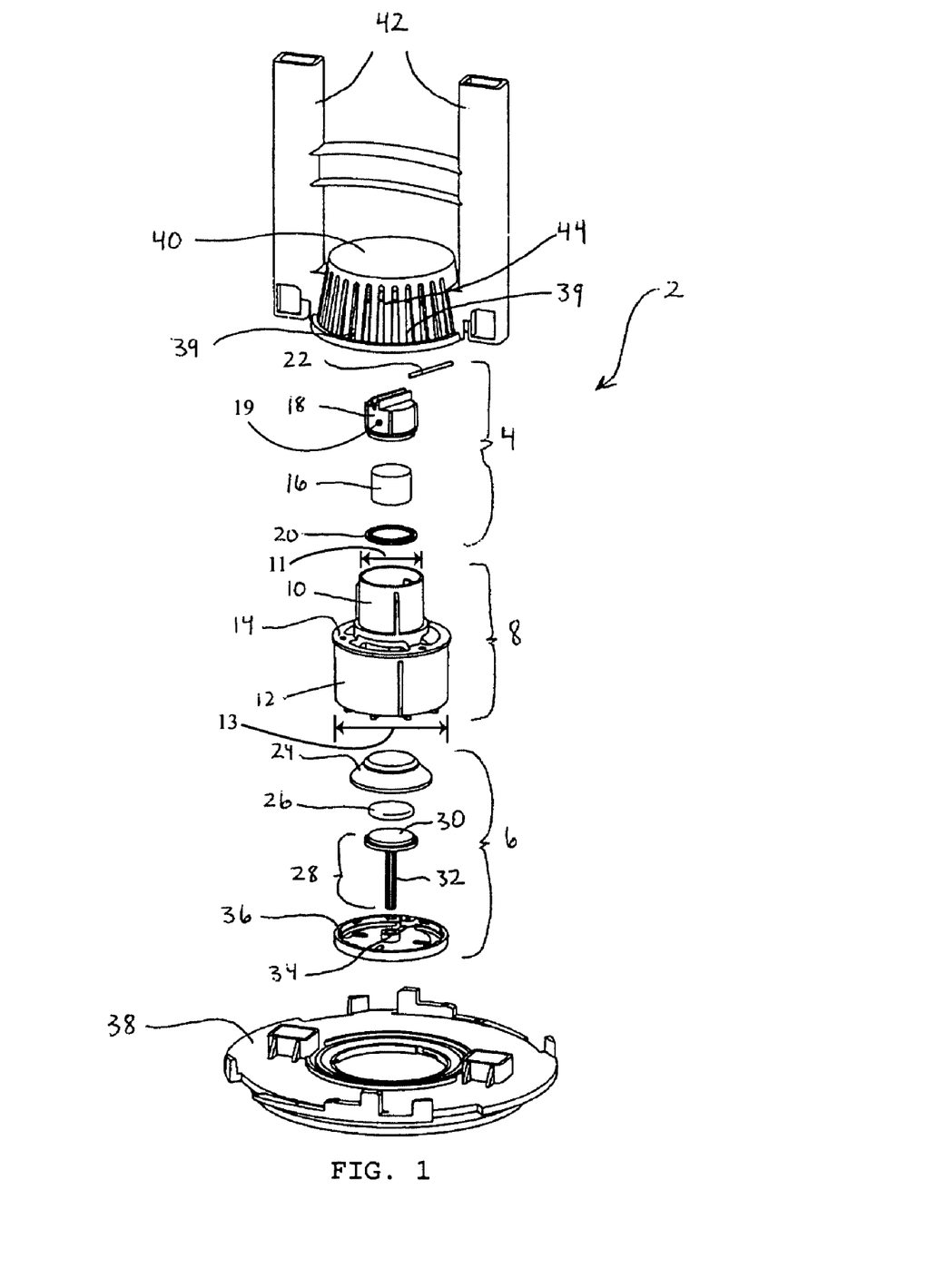
FIG. 1 is an exploded view of an alternate implementation of a hydraulic suction fuse configured for operation in a leaf trap.

Referring to FIG. 1, an implementation of a hydraulic suction fuse 2 is illustrated. As illustrated, the hydraulic suction fuse 2 includes a magnet assembly 4 and a fuse 6 comprised in a fuse body 8 which includes a first section 10 coupled to a second section 12 through a coupling flange 14. The first section 10 may include a first diameter 11 and the second section 12 may include a second diameter 13. As illustrated, the second diameter 13 may be larger than the first diameter 11 in particular implementations; however in other implementations, the first diameter 11 may be the same size as or larger than the second diameter 13. The magnet assembly 4 includes a magnet 16 coupled between an upper magnet support 18 and a lower magnet support 20. The magnet 16 illustrated in many of the embodiments herein is a solid magnet, as opposed to a ring magnet that has a hole in its center. Ring magnets are more expensive than solid magnets and either of these types or other magnets may be used in the various embodiments. The upper magnet support 18 includes an opening 19 into which a pin 22 may be inserted. The magnet assembly 4 may couple into the first section 10 of the fuse body 8. The fuse 6 includes a fuse cap 24, a attractor element 26, and a fuse stem 28. As illustrated, the fuse stem 28 includes a cap plate 30 coupled to a guide rod 32 at approximately its center. The guide rod 32 extends through a guide opening 34 in a second section cap 36 that couples to the second section 12 of the fuse body 8. In the implementation of a hydraulic suction fuse 2 illustrated in FIG. 1, an air intake 40 is coupled over the first and second sections 10, 12 of the fuse body 8 and is also coupled to the fuse body 8 through a fuse body mounting plate 38 that couples to a fuse housing 52 (see FIG. 2). In this particular implementation, two air towers 42 extend upwardly from the air intake 40 which place the air inlet 44 of the air intake 40 in fluid connection with ambient air. The air inlet 44 includes a plurality of apertures 39 therethrough that allow fluid (water, air, or both) to enter the air intake 40. The particular implementation of a hydraulic suction fuse 2 illustrated in FIG. 1 may be used as a closure to a debris collection trap in a swimming pool.

Figure 2:
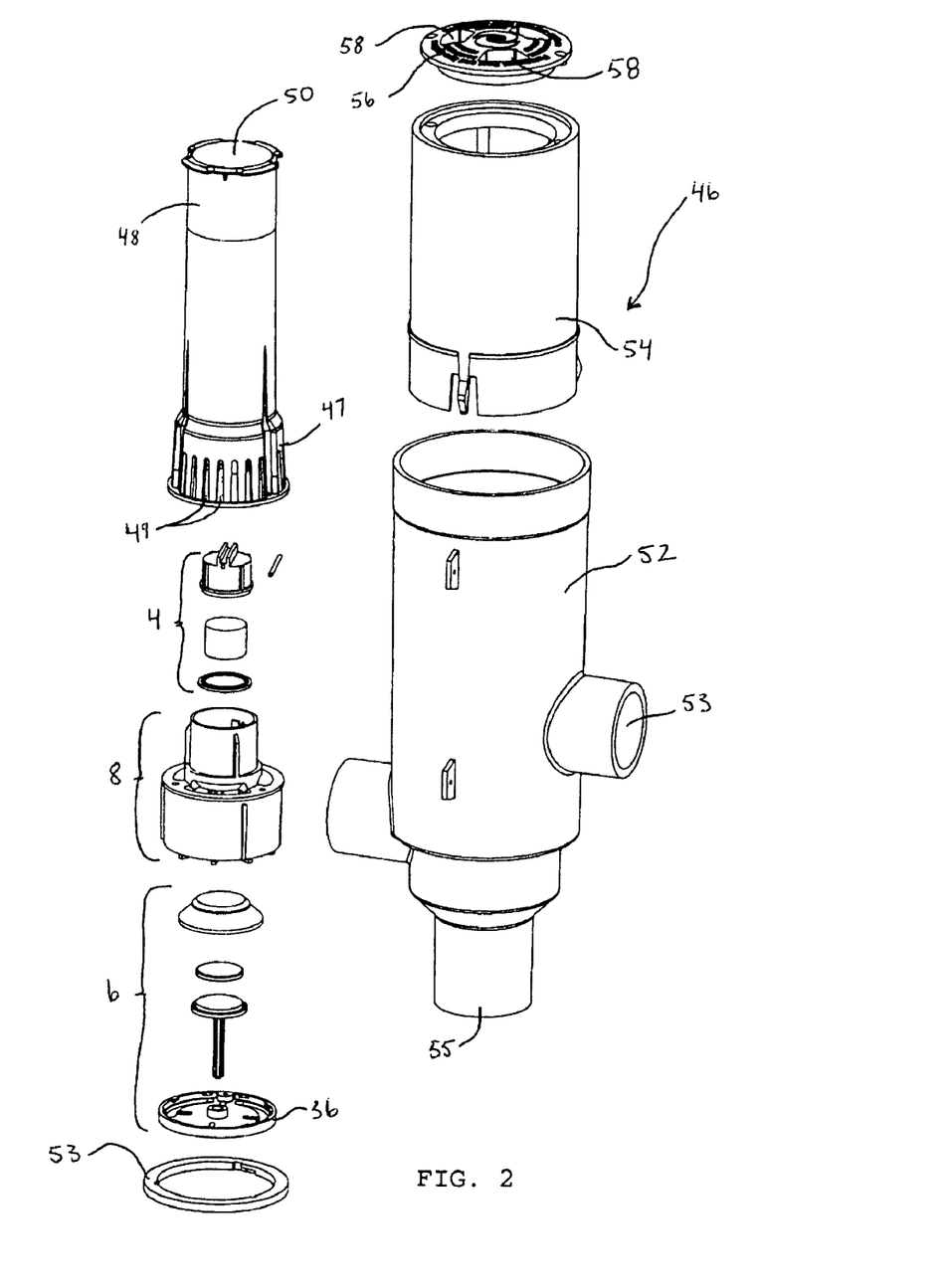
FIG. 2 is an exploded view of another implementation of a hydraulic suction fuse configured for operation in a canister in a pool deck.

Referring to FIG. 2, another particular implementation of a hydraulic suction fuse 46 is illustrated. The hydraulic suction fuse 46 includes a magnet assembly 4, a fuse 6, and a fuse body 8 coupled to a second section cap 36 like the implementation illustrated in FIG. 1. The air intake 48 differs from the implementation illustrated in FIG. 1, however, in that it includes only a single air tower 50 coupled to an air inlet 47 that includes a plurality of apertures 49 therethrough. A fuse coupling ring 53 is used to couple the assembled fuse body 8 and air intake 48 into a cylinder or fuse housing 52. The cylinder 52 may include an alternate air inlet 53 and a suction port 55 connected to a drain in a swimming pool. The cylinder 52 includes an extension pipe 54 into which the air tower 50 may extend. The extension pipe 54 includes a deck cap or air source 56 which may include a plurality of air vents 58 therethrough to allow fluid communication of ambient air through the extension pipe 54 into the air tower 50, the air inlet 47 and the air intake 48. The particular implementation of a hydraulic suction fuse 46 illustrated in FIG. 2 may be used in a canister embedded in a swimming pool deck.

FIG. 8 illustrates a system utilizing a hydraulic suction fuse assembly such as that shown in FIG. 2. The cylinder 52 depends from pool deck 130 into the ground. The depth of the cylinder 52 is sufficient to permit location of the hydraulic suction fuse below the water level 132 with the air tower(s) 50 extending to near or just above the water level 134 within the cylinder 52. Pipe 136 is in fluid communication with the water in the swimming pool 138 to maintain the water level 134 within the cylinder 52 at the same level as the water level 132 within the swimming pool 138. Pipe 142 conveys water from drain 144 to the pump with a bypass to the cylinder 52. If the drain 144 is blocked, the pump suction creates suction at the suction port 55 of the cylinder 52. The increased suction at the suction port 55 actuates the fuse, causing air to be drawn through the air tower 50.

Conventional hydraulic suction fuses are reset by a floating element raising the attractor up to the magnet after the fuse is opened. In present implementations, a floating element is not required in the fuse to reset the fuse after it is opened. To the contrary, as explained more below, for implementations where the fuse automatically resets, the fuse is configured so that the magnet and attractor element are maintained in a close relationship so that the attractor element is within the magnetic field of the magnet and the fuse automatically moves to its closed position when the suction reduces sufficiently. No float is required.

Figure 6:
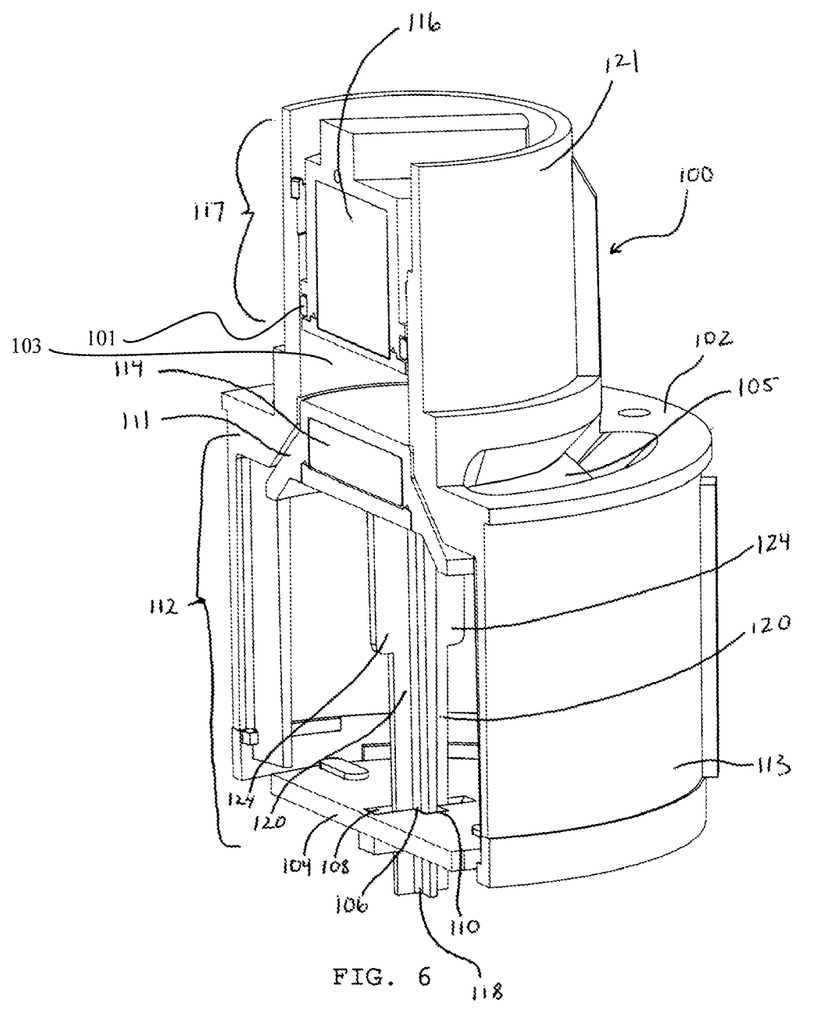
FIG. 6 is a cross section perspective view of yet another particular implementation of fuse body with a magnet assembly and a fuse coupled into the first and second sections, respectively of the fuse body.
Figure 7:
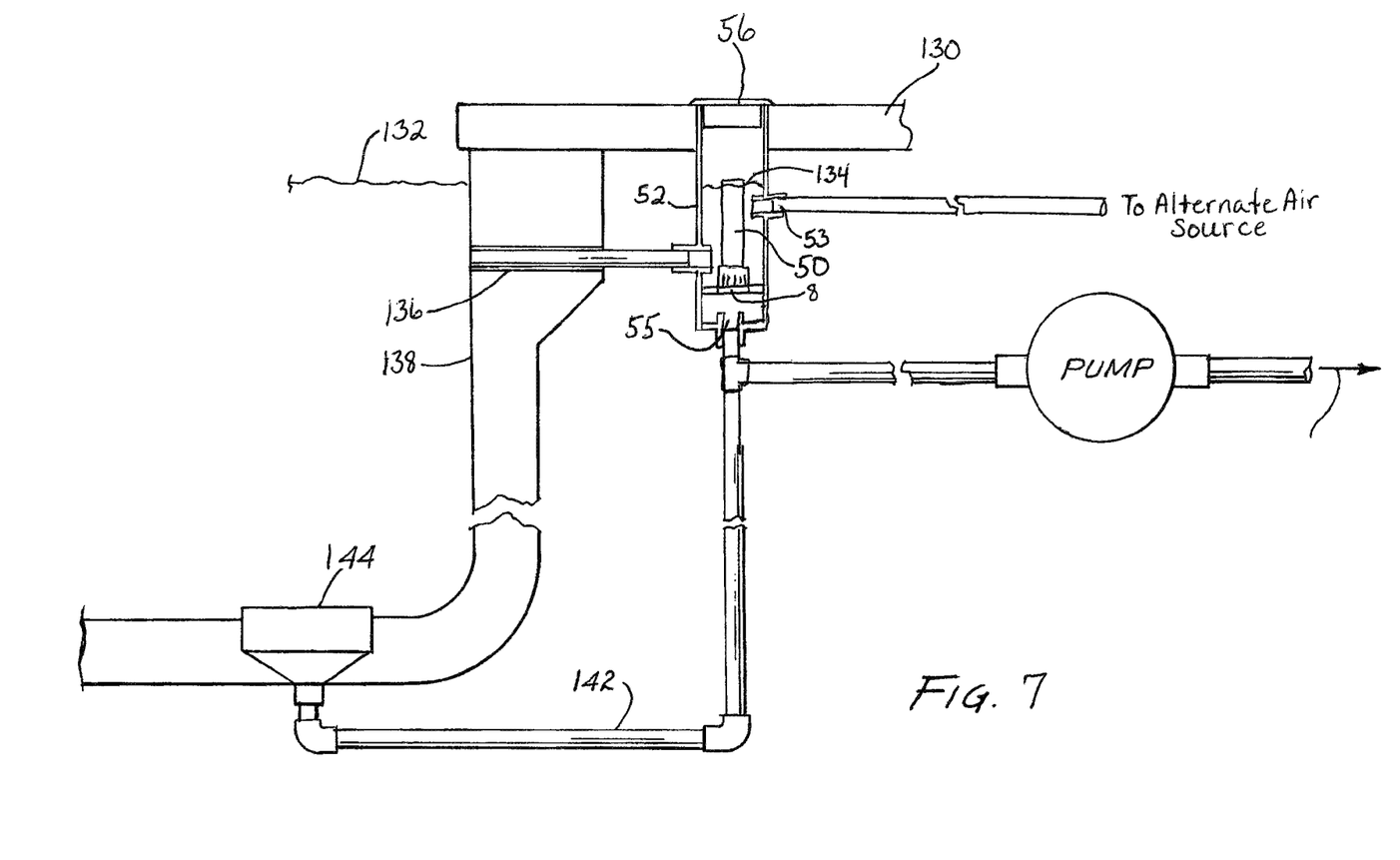
FIG. 7 illustrates a hydraulic suction fuse in line with a swimming pool drain and a pump.

The release channels 66 (FIG. 3) work to equalize the pressure below the fuse and within the chamber 103 (FIG. 6) between the attractor element 114 and the magnet assembly 117 (FIG. 6). By equalizing the pressure immediately above and below the fuse, the fuse is more difficult to actuate compared to a conventional fuse with a pressure differential. This allows the piston area that works against the magnet to be minimized and, thus, the size of the magnet to be reduced. Conventional floating fuse systems needed a big magnet because the start-up pull on the system was great. By angling the suction channels 64 in the fuse housing, less pull is experienced.

In implementations where the fuse point is adjustable through adjustably separating the space between the attractor and magnet, the trip point of the fuse may be set for a specific system, or may be set alternatively for automatic reset or be manual reset.

Figure 3:
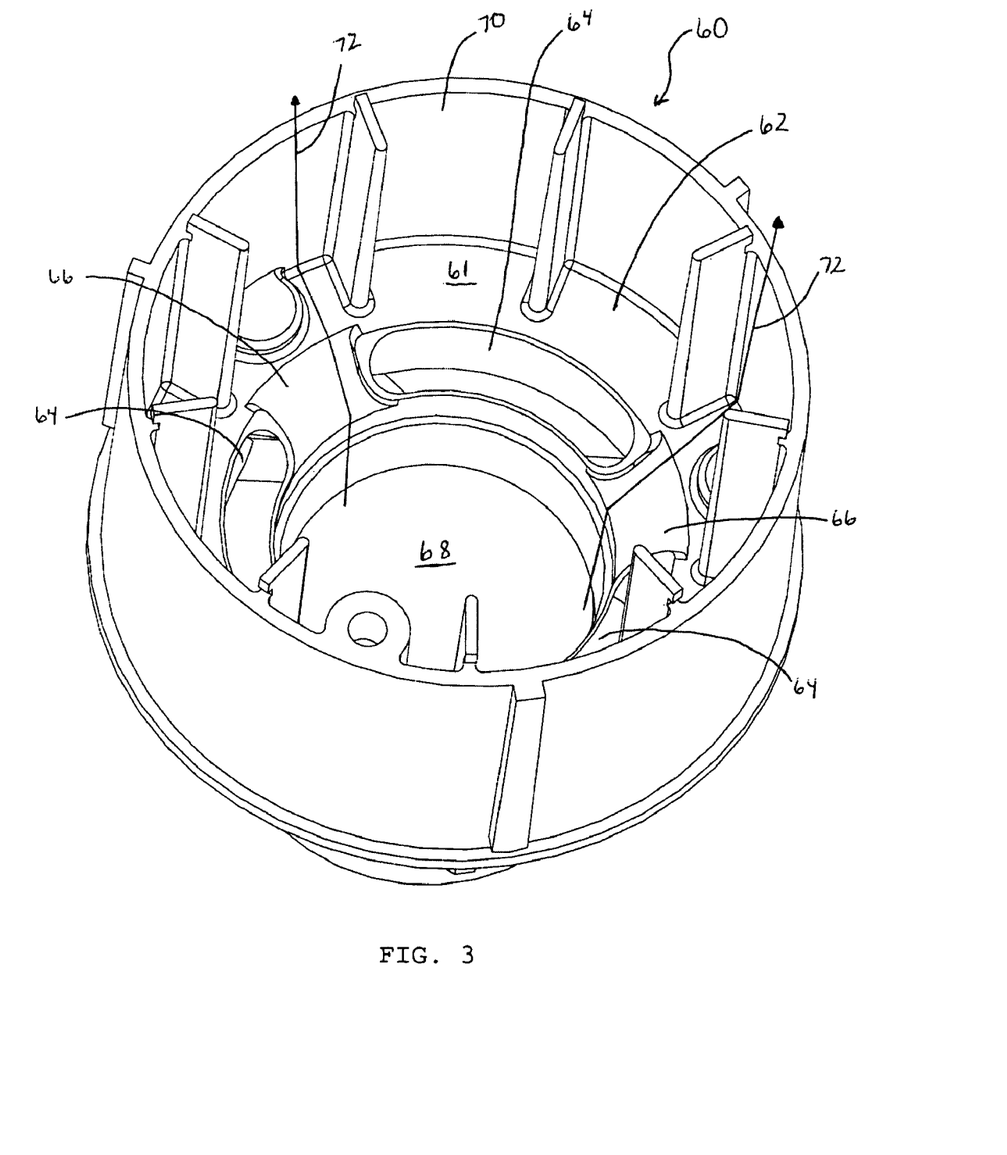
FIG. 3 is a bottom perspective view of a particular implementation of a fuse body.

FIG. 3 illustrates a particular implementation of a fuse body 60 in an inverted perspective view when compared with the views shown in FIGS. 1 and 2 to show the bottom of the fuse body 60. As illustrated, the coupling flange 62 includes a plurality of suction channels 64 therethrough. The suction channels 64 for this particular implementation are angled, although in other particular implementations, the suction channels 64 may not be angled. The angle of the suction channels 64 in the implementation illustrated in FIG. 3 is about 45 degrees relative to the side of the second section 70 of the fuse body that extends away from the coupling flange 62. In other implementations of a fuse body 60, the suction channels 64 may be angled between about 0 degrees to about 90 degrees.

The coupling flange 62 may also include an inner surface 61 in which a plurality of release channels 66 are included, which are grooved areas between the suction channels 64 that allow for a pressure balance above and below the fuse body 60. When the fuse cap 24 is present in the top aperture 68 of the fuse body 60 (i.e. the fuse is closed), the release channels 66 permit fluid pressure (from water, ambient air, or both) to balance above and below the fuse body 60. Indicator lines 72 illustrate a path through the release channels 66. If the pressure difference within and around the air tower and below the fuse becomes sufficiently large, the hydraulic suction fuse actuates and fluid from above the in and around the air tower into the pump.

Figure 4:
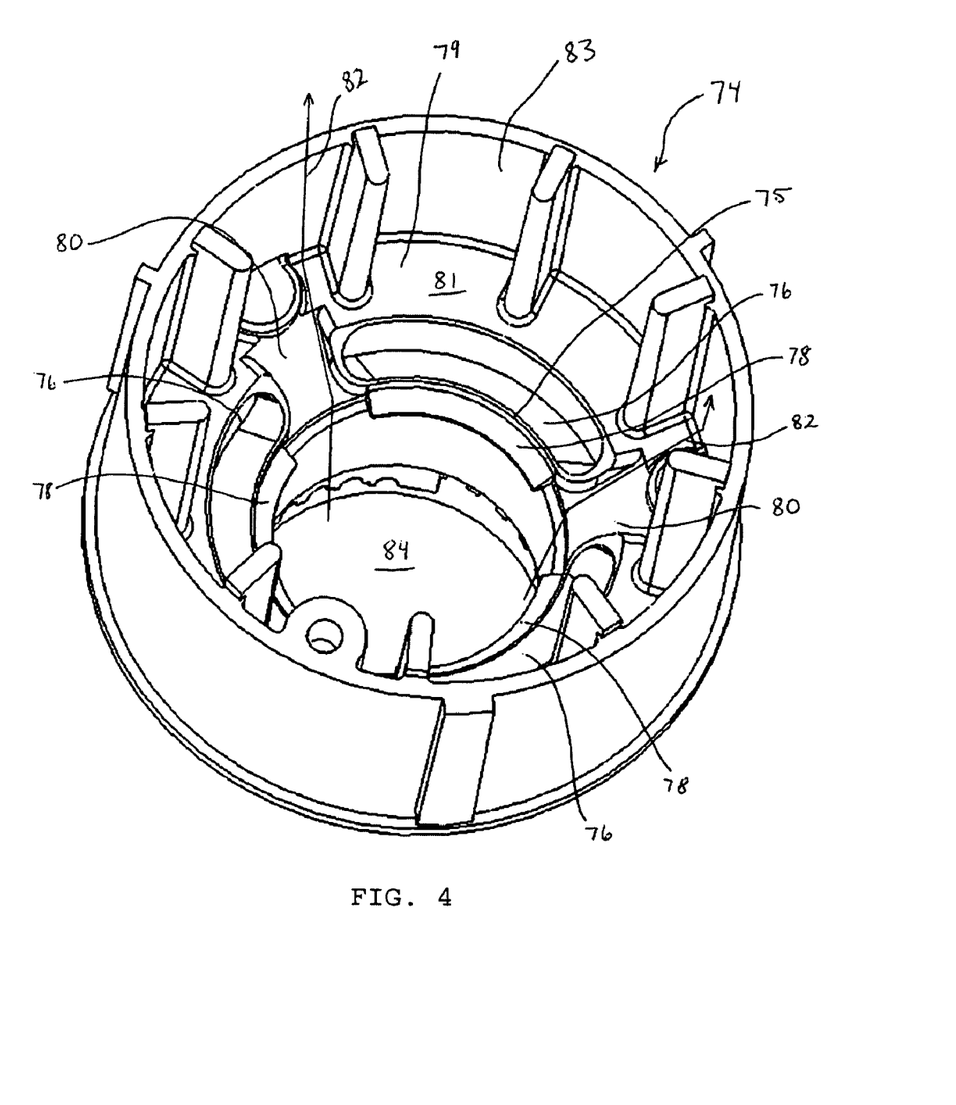
FIG. 4 is a bottom perspective view of another particular implementation of a fuse body.

Referring to FIG. 4, an inverted perspective view of another implementation of a fuse body 74 is illustrated. Like the implementation illustrated in FIG. 3, this implementation includes a coupling flange 79 with angled suction channels 76 therethrough and release channels 80. The release channels 80 are included in an inner surface 81 of the coupling flange 79. The inner surface 81 includes an inner perimeter 75 along which angled projections 78 are disposed adjacent to the suction channels 76. In response to pressure imbalances between the area above the fuse assembly and the second section 83, fluid may flow from the top aperture 84 along the path indicated by indicator line 82. The angled projections 78 may aid in directing the fluid flow into the release channels 80 and may serve to help improve the seal between the fuse cap and the fuse body 74 when the hydraulic suction fuse is closed.

Figure 5:
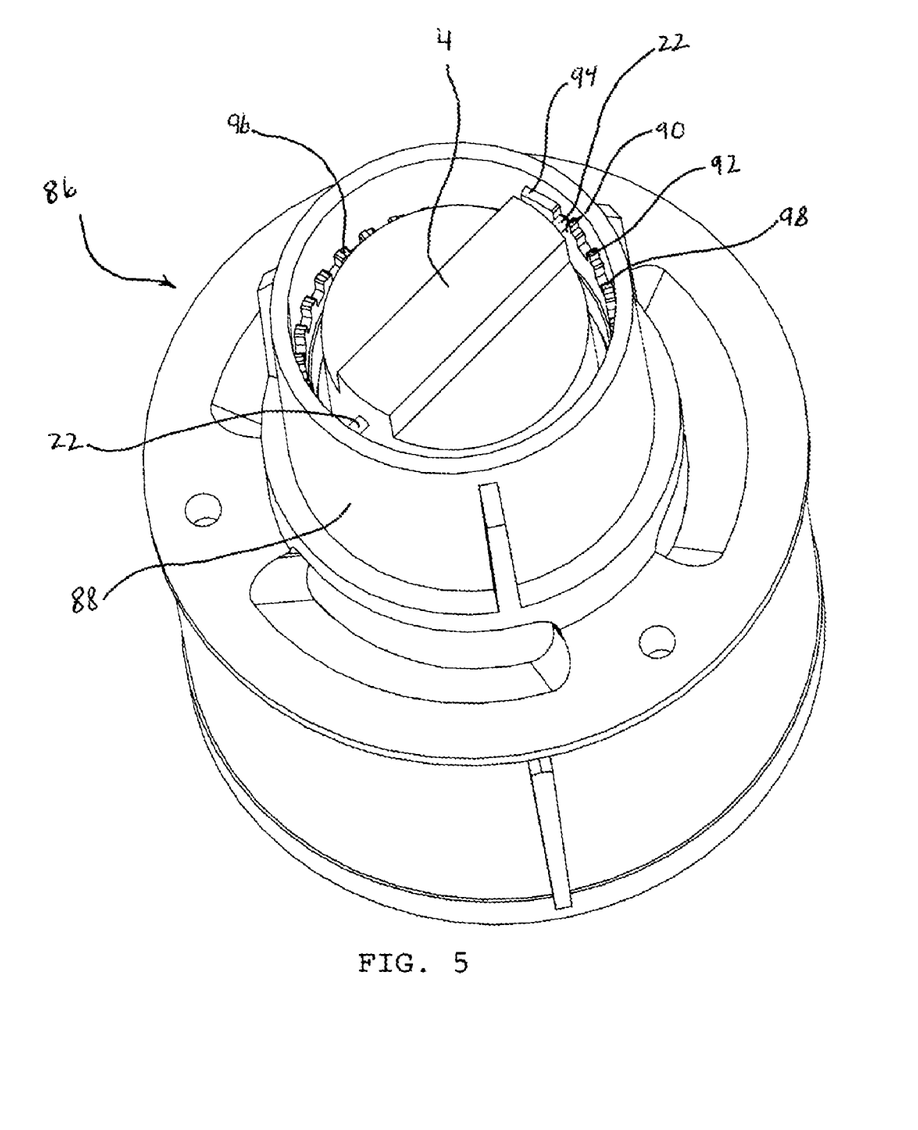
FIG. 5 is a top perspective view of another particular implementation of a fuse body with a magnet assembly coupled into a first section of the fuse body.

Referring to FIG. 5, a top perspective view of a particular implementation of a fuse body 86 is illustrated with a magnet assembly 4 coupled into the first section 88 of the fuse body 86. The first section 88 of the fuse body 86 includes a first step 90 into which a pin 22 of the magnet assembly 4 may rest or otherwise couple. The first step 90 has a first height, measured as the distance between a top-most shelf 94 and the bottom of the first step 90. A second step 92 may also be included in the first section 88 of the fuse body 86, having a second distance, where the second distance is further downward or upward than the first distance. As illustrated in FIG. 5, a plurality of other steps, each with a distance further downward or upward than the adjacent step may be sequentially arranged within the first section 88 of the fuse body 86, creating a downwardly or upwardly spiraling series of steps sized to engage with the pin 22 of the magnet assembly 4. In the implementation of a fuse body 86 illustrated, two sets of steps 96, 98 are included, each set spiraling around half of the perimeter of the first section 88 of the fuse body 86, though any number of steps or sets of steps may be included to adjust the distance between the magnet and the attractor serving to adjust the trip point of the fuse. When a pin 22 is used that extends through both sides of the magnet assembly 4, the two sets of steps 96, 98 may permit the magnet assembly 4 to be raised upwardly or lowered downwardly the same distance on each side of the magnet assembly 4 into or out of the first section 88 of the fuse body 86. While the implementation illustrated in FIG. 5 utilizes a pin 22 to engage with the two sets of steps 96, 98 other structures, such as, by non-limiting example, projections from the magnet assembly 4, bearings, wire, or any other engaging structure configured to engage with the steps 96, 98 could be used in other particular implementations.

Referring to FIG. 6, a cross sectional view of a particular implementation of a fuse body 100 is illustrated. As illustrated, the fuse body 100 includes a second section cap 104 that contains a guide opening 106 therethrough comprising first and second slots 108, 110. As illustrated, first slots 108 may be longer than second slots 110. A fuse 112 is shown slidably coupled into the second section 113 of the fuse body 100. The fuse 112 includes a rod 118 having first and second fins 120, 122 extending therefrom. As illustrated, in particular implementations of a fuse 112, the first fins 120 may be sized substantially the same as the second fins 122 up to a certain point on the rod 118, where fin extensions 124 project outwardly from the first fins 120. The first fins 120, in combination with the fin extensions 124, may be sized to slide through the first slots 108 in the guide opening 106, but not through the second slots 110. Accordingly, depending upon how the rod 118 is oriented relative to the first and second slots 108, 110 when the rod 118 is inserted into the guide opening 106 in the second section cap 104, the rod 118 may be able to slide through the guide opening 106 for a majority of its length or may be limited to sliding until the fin extensions 124 encounter the edges of the second slots 110. In this way, if the rod 118 is able to slide through the guide opening 106 for a majority of its length, the fuse may be set to open beyond the attractive field of the magnet so that the fuse does not automatically reset itself. On the contrary, if the rod 118 is oriented so that it is limited to sliding until the fin extensions 124 encounter the edges of the second slots 110, the fuse may be set so that it only opens to a point within the attractive field of the magnet so that the fuse automatically resets itself when the suction dissipates.

Referring to FIG. 6, implementations of a hydraulic suction fuse include both an open position and a closed position. The hydraulic suction fuse may be considered to be in a closed position (as shown in FIG. 6) when the fuse 112 is under the influence of magnetic force from the magnet 116 in the first section 121 of the fuse body 100 and the fuse cap 111 is coupled within the coupling flange 102 of the fuse body 100, closing the suction channels 105. A seal 101, such as a rubber o-ring, is included between the magnet assembly 117 housing and the inner wall of the first section 121 to maintain the pressure balance from the release channels 66 venting to the atmosphere. When suction force within the second section 113 of the fuse body 100 increases to a critical level (for example, when a swimmer has contacted the drain) ambient atmospheric pressure force against the fuse cap 111 through the suction channels 105 may overcome the magnetic force between the attractor element 114 and the magnet 116 and may push the fuse 112 downward, allowing fluid (air, water, or both air and water) to flow through the suction channels 105 and into the pump inlet. Unlike conventional hydraulic fuse systems using ring magnets, the suction channels 105 of this particular implementation are outside the boundary of the magnet 116. The hydraulic suction fuse is in an open position when the fuse 112 is not seated against or is otherwise decoupled from the coupling flange 102 of the fuse body 100. In the open position, the attractor element 114 may still be under the influence of magnetic force from the magnet 116, depending upon whether the fuse 118 is supported on the fin extensions 124 or not. Because the attractor element 114 and magnet 116 generally contain metallic elements, such as iron, and are used around water and pool chemicals, such as chlorine, it is desirable in most cases to seal the attractor element 114 and magnet 116 in waterproof housings. For example, the attractor element 114 and magnet 116 could each be housed in a plastic housing that is sonically welded closed. Alternatively, they could be encased in a rubber or plastic material.

Referring to FIGS. 3 and 6, during normal operation of the pool, opening of the fuse 112 from ordinary swings of pressure force within the second section 113 of the fuse body 100 may be avoided by use of release channels 66, which allow a balance of differential pressure between the first and second sections, 121, 113 of the fuse body 100. Because of the ability of the hydraulic suction fuse to handle ordinary pressure swings through the release channels 66, the size of the magnet may be greatly reduced. In particular implementations, the fuse may be opened by a pressure differential fusing point as small as about 5 to about 18 inches of mercury. The ability to obtain an economy of magnetic force in the hydraulic suction fuse may also be enhanced in particular implementations by the angle of the suction channels 105 and fuse cap. The suction channels 105, outside the boundary of the magnet 116, illustrated in FIG. 6 are angled about 45 degrees from vertical when the side of the second section 113 directed away from the coupling flange 102 is vertically aligned. In other implementations of a fuse body, however, the suction channels 105 may be angled from about 0 degrees to about 90 degrees from vertical. The sensitivity of the hydraulic suction fuse may be adjusted by increasing or decreasing the distance between the attractor element 114 and the magnet 116.

Use.

Implementations of hydraulic suction fuses may be used in several modes of operation. Particular implementations may reset automatically after suction force within the hydraulic suction fuse decreases, allowing the fuse to return from the open to the closed position. Automatic reset of the fuses may be desirable because after a swimmer has been released from the drain, the pump is again able to begin cycling water through the system by pulling water through the drain without requiring human intervention. Referring to FIG. 6, a hydraulic suction fuse may be configured for automatic resetting when, during assembly, the first fin 120 is inserted into the second slot 110. Because the first fin 120 has a fin extension 124, which acts as a spacer coupled to the first fin 120, the ability of the rod 118 to pass through the second slot 110 is limited to the distance from the end of the rod 118 to the fin extension 124. The length of the fin extension 124 down the rod 118 can be selected so that the attractor element 114 of the fuse 112 remains in the influence of the magnetic force emanating from the magnet 116 included in the magnet assembly 117. Because the attractor element 114 remains attracted to the magnet 116, when the fuse 112 is in the open position, the fuse 112 can still automatically rise back up into the closed position as the suction force within the second section 113 of the fuse body 100 decreases.

A hydraulic suction fuse may be configured for manual resetting when, during assembly, the first fin 120 is coupled into the first slot 108. Because the first slot 108 is larger than the second slot 110 and may be sized to allow the fin extension 124 to pass through it, when the hydraulic suction fuse is in the open position, a majority of the rod 118 of the fuse 112 will slide through the first and second slots 108, 110 in the second section cap 104. Because the fuse 112 is able to travel further away from the magnetic force emanating from the magnet 116, when the suction force within the second section 113 of the fuse body 100 decreases, the fuse 112 cannot return to the closed position on its own. Instead, the fuse 112 may be manually brought upward into the magnetic force emanating from the magnet 116 by an operator or service personnel. Once the fuse 112 is held by the magnetic force, it will remain there until the suction force in the second section 113 indicates that a swimmer or other object is blocking the drain.

Implementations of hydraulic suction fuses may also include the ability for the fuse point of the hydraulic suction fuse to be adjusted. The fuse point represents the amount of increased suction force the fuse experiences before moving from the closed to the open position and beginning to introduce air into the pump. Referring to FIGS. 5 and 6, the fuse point may be set in particular implementations by adjusting the distance between the magnet assembly 117 and the fuse 112. Since the distance the fuse 112 extends into the coupling flange 102 is fixed, by moving the magnet assembly 117 upward away from the fuse 112, the fuse point can be reduced, or in other words, the amount of suction force required to open the fuse is diminished. Without being bound by any theory, the suction force may be diminished because the amount of magnetic force exerted on the attractor element 114 by the magnet 116 decreases as the distance between them increases. By moving the magnet assembly 117 toward the fuse 112, the fuse point can be increased.

The fuse point may be adjusted by decoupling the magnet assembly 4 from a first step 90 having a first height, rotating the magnet assembly 4, and coupling the magnet assembly 4 with a second step 92 having a second height. In this method, the second distance of the second step 92 may be either larger or smaller relative to the first distance of the first step 90 depending on whether the magnet assembly 4 is being adjusted downwardly or upwardly to raise or lower the fuse point, respectively. The magnet assembly 4 may be coupled with the first and second steps 90, 92 with a pin 22.

FIG. 5 illustrates, among other aspects, the adjustable fusing point nature of particular implementations of a fuse system. In FIG. 5, as explained in more detail above, there are many different possible fusing point sensitivities to which the hydraulic fuse may be set to adjust the pressure point at which the fuse will open. By adjusting the relative at rest spacing between the magnet and the attractor element, the sensitivity of the fuse may be adjusted—closer for a higher pressure require to open. FIG. 6 illustrates, among other aspects, the adjustable reset nature of particular implementations of a fusing system. In FIG. 6, as explained in more detail above, the fuse point may be adjusted between two sensitivity levels for fuse points, one within the magnetic pull of the magnet and one outside the magnetic pull of the magnet, to adjust between automatic reset and manual reset. As an alternative, the implementation of FIG. 6 may be altered by inserting a spacer that is separate from the first fin, such as a spacer ring surrounding the first fin, between the attractor element 114 and the second section cap 104. By including or not including, or alternatively by adjusting the size of the separate spacer, the open position of the fuse may be adapted so that the fuse is configured either for automatic reset of the fuse or requires manual reset of the fuse. Although the examples provided herein include a magnet in one position and an attractor element in another position, it should be understood that these components may be equivalently swapped, or that the attractor element may be configured in the form of a magnet so long as the two components, whatever form they take, magnetically attract when brought into close relation to each other.

Materials.

Implementations of hydraulic suction fuses, assemblies, and implementing components, may be constructed of a wide variety of materials. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide, Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material, such as a refractory material; and/or any combination of the foregoing thereof. For the exemplary purposes of this disclosure, the fuse body and air intake may be formed of polyvinyl chloride (PVC), the attractor element may be formed of a magnetizable metal such as iron, and the magnet may be formed of a ferrite magnetic material. The magnet may also be formed of a ceramic magnetic material in particular implementations.

Some components defining hydraulic suction fuse implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components. For the exemplary purposes of this disclosure, the first and second sections of the fuse body and the coupling flange may be formed integrally through injection molding.

It will be understood that implementations are not limited to the specific components disclosed herein, as virtually any components consistent with the intended operation of a method and/or system implementation for a hydraulic suction fuse may be utilized. Accordingly, for example, although particular fuse bodies, fuses, and air intakes may be disclosed, such components may comprise any shape, size, style, type, model, version, class, grade, measurement, concentration, material, weight, quantity, and/or the like consistent with the intended operation of a method and/or system implementation for a hydraulic suction fuse may be used.

In places where the description above refers to particular implementations of hydraulic suction fuses, it should be readily apparent that a number of modifications may be made without departing from the spirit thereof and that these implementations may be applied to other hydraulic suction fuses. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A swimming pool hydraulic suction fuse comprising:
a fuse housing comprising a suction port, and an air source; and
a fuse assembly coupled into the fuse housing, the fuse assembly comprising:
a fuse body having a first section and a second section;
an air tower coupled to and rising above the fuse body;
a magnet assembly coupled to the first section of the fuse body; and
a fuse, the fuse coupled to the second section of the fuse body and comprising an attractor element coupled between a fuse cap and a fuse stem, the fuse further comprising a chamber between the attractor element and the magnet assembly, and at least one release channel in fluid communication with the chamber and the fuse housing.

2. The swimming pool hydraulic suction fuse of claim 1, wherein the first section of the fuse body comprises a first diameter and the second section of the fuse body comprises a second diameter, wherein the second diameter is larger than the first diameter and the first section and second section of the fuse body are joined through a coupling flange extending outwardly from an end of the first section of the fuse body.

3. The swimming pool hydraulic suction fuse of claim 2, wherein the coupling flange comprises at least one suction channel therethrough.

4. The swimming pool hydraulic suction fuse of claim 3, wherein the suction channel extends through the coupling flange at an angle relative to a side of the second section of the fuse body.

5. The swimming pool hydraulic suction fuse of claim 4, wherein the angle of the suction channel is about 45 degrees.

6. The swimming pool hydraulic suction fuse of claim 1, wherein the fuse cap comprises a center flattened portion and an angled flange extending away from the center flattened portion at an angle relative to the center flattened portion.

7. The swimming pool hydraulic suction fuse of claim 6, wherein the angle of the angled flange is about 45 degrees.

8. The swimming pool hydraulic suction fuse of claim 1, wherein the fuse stem comprises a rod coupled substantially at the center of the center flattened portion and the rod extends into an aperture in a second section cap coupled to the second section of the fuse body.

9. The swimming pool hydraulic suction fuse of claim 8, wherein the rod comprises at least one fin comprising at least one fin extension thereon configured to allow passage of the rod along a portion of a length of the rod when the rod is engaged through a slot in the second section cap of the fuse body.

10. The swimming pool hydraulic suction fuse of claim 1, wherein the fuse body comprises at least one step and the magnet assembly is configured to couple with the at least one step.

11. The swimming pool hydraulic suction fuse of claim 10, wherein the magnet assembly comprises a pin and couples to the at least one step of the fuse body through the pin.

12. The swimming pool hydraulic suction fuse system of claim 1, wherein the magnet assembly comprises a solid magnet.

13. A fuse assembly for a swimming pool hydraulic suction fuse, the fuse assembly comprising:
a fuse housing comprising a suction port and an air source inlet; and
a fuse body positioned between the suction port and the air source inlet and comprising a magnet and an attractor element at least one of which is moveably mounted within the fuse body, wherein in an open fuse position the attractor element and magnet are separated a first distance from each other and in a closed fuse position the attractor element and magnet are separated a second distance from each other less than the first distance;

wherein the fuse body comprises at least one suction channel providing fluid communication between the suction port and the air source inlet in the open fuse position and blocking fluid communication between the suction port and the air source inlet in the closed fuse position; and wherein the at least one suction channel is outside the boundary of the magnet.

14. The fuse assembly of claim 13, wherein the at least one suction channel is angled relative to the attractor element.

15. The fuse assembly of claim 14, wherein the angle of the at least one suction channel is angled between about 0 degrees to about 90 degrees.

16. The fuse assembly of claim 14, wherein the angle of the at least one suction channel is about 45 degrees.

17. The fuse assembly of claim 13, wherein a position of the magnet in relation to the attractor in the closed fuse position is adjustable between at least two positions to adjust a fusing point of the fuse.

18. The fuse assembly of claim 17, wherein the sensitivity of the fuse is adjustable to a position wherein the fuse is opened by a pressure differential at a fusing point between 5 and 18 inches of mercury.

19. The fuse assembly of claim 13, wherein a position of the attractor in its open position is adjustable between at least two positions to adjust the fuse between a manual reset state and an automatic reset state.

20. The fuse assembly of claim 13, further comprising at least one air tower coupled to the fuse body and extending upward of the fuse body to ambient air when installed in an operating pool system.

21. The fuse assembly of claim 20, wherein the at least one air tower comprises at least two air towers.

22. A fuse assembly for a swimming pool hydraulic suction fuse, the fuse assembly comprising:

a fuse housing comprising a suction port and an air source inlet; and a fuse body positioned between the suction port and the air source inlet and comprising a magnet and an attractor element at least one of which is moveably mounted within the fuse body, wherein in an open fuse position the attractor element and magnet are separated a first distance from each other and in a closed fuse position the attractor element and magnet are separated a second distance from each other less than the first distance;

wherein the fuse body comprises at least one suction channel providing fluid communication between the suction port and the air source inlet in the open fuse position and blocking fluid communication between the suction port and the air source inlet in the closed fuse position; and wherein the second distance separation between the attractor element and the magnet in the closed fuse position is adjustable between at least two positions to adjust a fusing point of the fuse.

23. The fuse assembly of claim 22, wherein the second distance separation is adjustable to a distance wherein the fuse is opened by a pressure differential at a fusing point between 5 and 18 inches of mercury.

24. A fuse assembly for a swimming pool hydraulic suction fuse, the fuse assembly comprising:

a fuse housing comprising a suction port and an air source inlet; and a fuse body positioned between the suction port and the air source inlet and comprising a magnet and an attractor element at least one of which is moveably mounted within the fuse body, wherein in an open fuse position the attractor element and magnet are separated a first distance from each other and in a closed fuse position the attractor element and magnet are separated a second distance from each other less than the first distance;

wherein the fuse body comprises at least one suction channel providing fluid communication between the suction port and the air source inlet in the open fuse position and blocking fluid communication between the suction port and the air source inlet in the closed fuse position; and wherein the first distance separation between the attractor element and the magnet in the open fuse position is adjustable between at a manual reset state and an automatic reset state.

* * * * *